United States Patent [19]

Frölich et al.

[11] 4,251,441

[45] Feb. 17, 1981

[54] PIGMENTS OF MIXTURES OF METHOXYNITROBENZENE-AZO-METHOXY-ACETANILIDES

[75] Inventors: Heinrich Frölich, Niedernhausen; Klaüs Hünger, Kelkheim, both of Fed. Rep. of Germany

[73] Assignee: Hoechst Aktiengesellschaft, Frankfurt am Main, Fed. Rep. of Germany

[21] Appl. No.: 36,381

[22] Filed: May 7, 1979

Related U.S. Application Data

[63] Continuation of Ser. No. 915,768, Jun. 15, 1978, abandoned.

[30] Foreign Application Priority Data

Jun. 18, 1977 [DE] Fed. Rep. of Germany ....... 2727531

[51] Int. Cl.$^3$ ................. C09B 29/32; D06P 1/18; D06P 1/44; D06P 1/90
[52] U.S. Cl. ......................................... 260/193; 8/639; 106/23; 106/288 Q; 106/309; 260/144
[58] Field of Search ..................... 260/193; 8/26; 106/288 Q

[56] References Cited

U.S. PATENT DOCUMENTS

| | | | |
|---|---|---|---|
| 2,145,398 | 1/1939 | Lang | 260/193 |
| 2,229,049 | 1/1941 | Dahlen et al. | 260/201 |
| 3,032,546 | 5/1962 | Johnson | 260/193 |
| 3,445,453 | 5/1969 | Stocker | 260/193 |
| 3,446,640 | 5/1969 | Orlova et al. | 106/288 |
| 3,520,869 | 7/1970 | Stocker | 260/193 |

FOREIGN PATENT DOCUMENTS

| | | | |
|---|---|---|---|
| 679481 | 7/1939 | Fed. Rep. of Germany | 260/193 |
| 517456 | 1/1940 | United Kingdom | 260/208 |
| 544191 | 4/1942 | United Kingdom | 260/208 |
| 1163794 | 9/1969 | United Kingdom | 260/208 |
| 1428633 | 3/1976 | United Kingdom | 260/208 |
| 1460967 | 1/1977 | United Kingdom | 260/208 |

*Primary Examiner*—Floyd D. Higel
*Attorney, Agent, or Firm*—Curtis, Morris & Safford

[57] ABSTRACT

Mixtures of monoazo compounds which are obtainable by diazotizing 0.75 to 0.85 molar equivalent of 5-nitro-2-amino-anisol and 0.25 to 0.15 molar equivalent of 3-nitro-4-amino-anisol and coupling onto 2-acetoacetylamino-anisol are pigments of high tinctorial strength, transparency, gloss and fastness to light having good rheological properties.

2 Claims, No Drawings

PIGMENTS OF MIXTURES OF METHOXYNITROBENZENE-AZO-METHOXY-ACETANILIDES

This is a continuation of application Ser. No. 915,768, filed June 15, 1978, and now abandoned.

The present invention relates to mixtures of azo compounds, a process for their preparation and their use.

The invention provides mixtures of 75 to 85% by weight of the compound of the formula I

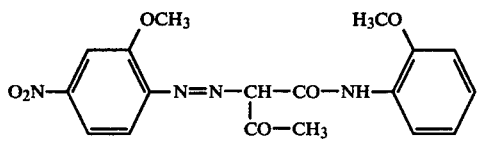

and 25 to 15% by weight of the compound of the formula II

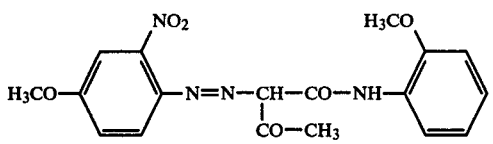

Another object of the invention is to provide an advantageous process for the preparation of the above-mentioned mixtures, which comprises diazotizing 0.75 to 0.85 molar equivalent of 5-nitro-2-amino-anisol and 0.25 to 0.15 molar equivalent of 3-nitro-4-amino-anisol and coupling it onto 2-acetoacetylamino-anisol.

Furthermore, an object of the invention is the use of the above-mentioned mixtures as pigments, especially for the dyeing and printing of paper, plastic materials, natural and synthetic resins, caoutchouc, viscose rayon, cellulose esters and/or ethers, polyolefins, polyurethanes, polyacrylonitrile or polyglycol-terephthalates, as well as for the preparation of printing inks, gloss paints or emulsion paints.

The mixtures of the invention can be obtained by intensive mixing of the components in the indicated mixing ratio, but more, advantageously by the so-called mixed coupling. For this purpose the above-mentioned amines are diazotized separately or preferably jointly according to common methods and are coupled onto 2-acetoacetylamino-anisol advantageously in the presence of non-ionic, cationic, amphoteric and preferably anionic surface-active agents.

The diazotization of the amines may be effected, for example, with alkali metal nitrites or nitrous acid lower alkyl esters and a mineral acid, but also with nitrosylsulfuric acid at a temperature in the range of from about $-20°$ to $+30°$ C., preferably from $0°$ to $20°$ C. In this process, as well as in the subsequent coupling, it may be advantageous to add surface-active agents, such as non-ionic, anionic or cationic dispersing agents. The coupling is effected at a temperature in the range of from about $-20°$ to $+50°$ C., preferably from $0°$ to $40°$ C., especially from $10°$ to $30°$ C. The diazotization and coupling processes may also be carried out in the presence of appropriate organic solvents, for example glacial acetic acid, lower alkanols, dioxan, formamide, dimethylformamide, dimethylsulfoxide, pyridine or N-methylpyrrolidone.

In order to promote the dispersibility, alkali-soluble resin-like products are preferably added, for example rosin resins, polymeric rosin resins, resin soap, chemically modified rosin resins, such as rosin-maleinate resins, alkyd resins, and other synthetic hydrocarbon resins with a higher acid number, or combinations of these resins with one another. These resins may be present in the product with free groups that are capable of forming a salt, or may be partly or completely in the form of salts, for example with alkaline earth metal ions. It may also be advantageous to perform the coupling in the presence of a finely divided insoluble material, for example alkaline earth metal sulfates and carbonates, titanium dioxide or clay minerals, as well as in the presence of very finely divided organic plastic materials.

The mixtures of the invention are marked by a high tinctorial strength, a high gloss, a very good transparency as well as good rheological properties. The mixtures according to the invention represent a pure greenish normal yellow, however, they show a more reddish shade of yellow than the component of the formula I. The tinctorial strength and color shade are very similar to Pigment Yellow 12 used to a large extent in the printing industry, however, in contradistinction thereto the mixtures of the invention are marked by a considerably increased fastness to light as well as by a higher transparency, a higher gloss and better flow properties in binder systems. Due to their surprisingly high tinctorial strength, the mixtures of the invention are superior to analogous mixtures which are obtained from 3-nitro-4-amino-anisol and 4-chloro-2-nitro-aniline as diazo components.

The following examples serve to illustrate the invention. The percentages are by weight, unless otherwise stated.

EXAMPLE 1

28.6 Grams of 5-nitro-2-amino-anisol and 5 g of 3-nitro-4-amino-anisol are converted in a mixture of 61.5 g of 31% hydrochloric acid and 21 g of water into the corresponding hydrochlorides and are diazotized at a temperature of from $0°$ to $10°$ C. with 34.5 g of 40% sodium nitrite solution.

43.1 g of acetoacetic acid-o-anisidide are dissolved in 600 g of water and 40.7 g of 33% sodium hydroxide solution at room temperature, and to this solution there is added a solution of an anionic dispersing agent which contains 3 g of the sodium salt of the diisodecyl ester of sulfosuccinic acid. Subsequently the acetoacetic acid-o-anisidide is precipitated from the solution at $15°$ C., by adding 23.1 g of glacial acetic acid, to give a fine suspension, and after increasing the pH value to 6.5 coupling is performed within 1 hour by continuously adding the clarified diazonium salt solution. Thereupon the suspension of the coupling product is adjusted to neutral, and a solution of 5.6 g of a polymer rosin resin in 30 g of water and 2 g of 33% sodium hydroxide solution is added, then the mixture is heated to $90°$ C., and at this temperature a solution of 2 g of calcium chloride is added; thereafter the temperature is maintained for 1 hour at $90°$ C. By diluting with cold water the product is then cooled to $70°$ C., and the finished pigment is filtered off with suction, washed, dried and ground.

EXAMPLE 2

43.1 Grams of acetoacetic acid-o-anisidide are dissolved in water and sodium hydroxide solution, as has been described in Example 1, and the solution is clarified by filtration after adding 2 g of kieselguhr. The clarified solution is then mixed with an aqueous emulsion which contains 3.6 g of a mixture of a mineral oil having a boiling range of from 180° to 330° C. and a salt of the formula $CH_3(CH_2)_{11-17}$—$SO_2$—NH—$CH_2$—COONa. Subsequently the coupling component is precipitated at 15° C. with 23.1 g of glacial acetic acid to give a finely divided suspension. After increasing the pH value to 6.5, said suspension is coupled within 1 hour with a diazonium salt solution prepared according to the method described in Example 1. The coupling mixture is stirred for 1 hour at room temperature; thereafter a warm solution of 3.5 g of rosin and 31 g of a rosin-maleinate resin having an acid number of 280 to 310 in 15 g of water and 3.4 g of 33% sodium hydroxide solution is added. Subsequently the suspension obtained is heated while stirring to 70° C. within 45 minutes, stirring is continued for 30 minutes at this temperature, and then the mixture is processed to give the pigment, as has been described in Example 1.

EXAMPLE 3

43.1 g of acetoacetic acid-o-anisidide are coupled as has been described in Example 2. Immediately after the coupling 0.9 g of $H_2SO_4$ in the form of diluted sulfuric acid is added while stirring to the suspension of the coupling product, and thereafter 2 g of crystallized barium chloride are introduced. Stirring is then continued for 1 hour and the process is followed up according to Example 2.

EXAMPLE 4

25.2 Grams of 5-nitro-2-amino-anisol and 8.4 g of 3-nitro-4-amino-anisol are diazotized, as has been described in Example 1, and are coupled with 43.1 g of acetoacetic acid-o-anisidide and processed to give the pigment. The pigment obtained shows a more reddish shade of yellow than the one which has been obtained according to Example 1, however, otherwise it has similarly favorable properties.

EXAMPLE 5

20 Grams of the pigment powder obtained according to Example 1 are dispersed on a triple roller mill in 113 g of a commercial letterpress printing/offset printing varnish and are printed onto art printing paper with an amount applied of 1.5 g/m². A yellow print is obtained which has a very high tinctorial strength approximately in the color shade of Pigment Yellow 12, with an excellent gloss, a very good transparency and a fastness to light which is clearly superior to that of Pigment Yellow 12. The printing paste obtained is distinguished by very good flow properties.

EXAMPLE 6

If the pigment of formula I is prepared from 33.6 g of 5-nitro-2-amino-anisol and 43.1 g of acetoacetic acid-o-anisidide in a manner analogous to that of Example 1 and in a corresponding manner the pigment of formula II is prepared from 33.6 g of 3-nitro-4-aminoanisol and 43.1 g of acetoacetic acid-o-anisidide, and the two pigments are intimately mixed at a molar ratio of 0.85:0.15, by mixing the powdered pigments for 16 hours on a roller nest, a pigment powder is obtained which shows approximately the same properties as the one prepared according to Example 1.

We claim:

1. A composition of matter consisting essentially of 75 to 85% by weight of a first compound of the formula

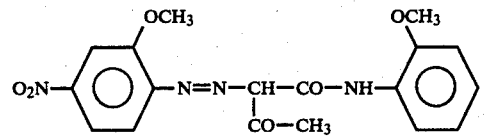

and of 25 to 15% by weight of a second compound of the formula

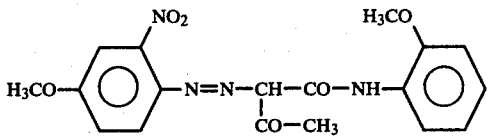

2. A composition as defined in claim 1, consisting of 75 to 85% by weight of the first compound and of 25 to 15% by weight of the second compound.

* * * * *